US012607051B2

(12) United States Patent
Zannoni

(10) Patent No.: US 12,607,051 B2
(45) Date of Patent: Apr. 21, 2026

(54) DOOR HOLDER

(71) Applicant: William J Zannoni, Dracut, MA (US)

(72) Inventor: William J Zannoni, Dracut, MA (US)

(*) Notice: Subject to any disclaimer, the term of this patent is extended or adjusted under 35 U.S.C. 154(b) by 14 days.

(21) Appl. No.: 18/346,251

(22) Filed: Jul. 2, 2023

(65) Prior Publication Data

US 2024/0003172 A1 Jan. 4, 2024

Related U.S. Application Data

(60) Provisional application No. 63/358,056, filed on Jul. 1, 2022.

(51) Int. Cl.
*E05C 17/02* (2006.01)
*E05F 5/06* (2006.01)

(52) U.S. Cl.
CPC ................ *E05C 17/02* (2013.01); *E05F 5/06* (2013.01)

(58) Field of Classification Search
CPC .......... E05C 17/00; E05C 17/02; E05C 17/46; E05C 17/50; E05C 17/52; E05C 17/54; E05C 17/04; E05C 19/007; E05C 19/06; E05C 19/18; E05C 19/184; E05C 19/188; Y10S 292/15; Y10S 292/19
USPC .......................................... 16/82, 86 A, 86 B
See application file for complete search history.

(56) References Cited

U.S. PATENT DOCUMENTS

| | | | | |
|---|---|---|---|---|
| 245,082 A | | 8/1881 | Massey | |
| 518,343 A | | 4/1894 | Coats | |
| 968,936 A | | 8/1910 | Hagerty | |
| 1,280,048 A | | 9/1918 | Lavender | |
| 1,347,048 A | | 7/1920 | Mardaus | |
| 2,558,614 A | | 6/1951 | Jewell | |
| 2,976,071 A | | 3/1961 | Anderson | |
| 3,620,483 A | * | 11/1971 | Weinberger | E05C 17/54 16/86 A |
| 5,226,201 A | | 7/1993 | Lefebvre | |
| 6,016,588 A | | 1/2000 | Kamerschen | |
| 6,161,252 A | * | 12/2000 | Rodriguez | E05C 17/52 292/342 |
| 2005/0071950 A1 | | 4/2005 | Nantais | |
| 2007/0044274 A1 | * | 3/2007 | Chen | E05C 17/446 16/82 |
| 2014/0001775 A1 | * | 1/2014 | Mullenbach | E05C 17/443 292/288 |
| 2017/0321458 A1 | * | 11/2017 | Cirilli | E05C 17/50 |
| 2021/0180374 A1 | * | 6/2021 | Malone | E05C 17/505 |
| 2022/0042358 A1 | * | 2/2022 | Gordon | E05C 17/52 |

FOREIGN PATENT DOCUMENTS

| | | |
|---|---|---|
| DE | 8629564 | 1/1987 |
| DE | 20022623 | 4/2002 |
| DE | 202007009274 | 10/2007 |
| EP | 0250352 | 12/1987 |

(Continued)

*Primary Examiner* — Christine M Mills
*Assistant Examiner* — Yahya Sidky
(74) *Attorney, Agent, or Firm* — Brian M. Gaff, Esq.

(57) ABSTRACT

A door holder having a ring defining a hole, a leg having one end proximate to the ring and a second distal end, the leg having at least one adjustable parameter. The lip is located near the distal end of the leg. A retaining means is located near the ring to fasten the door holder through the hole to a fixed structure, such as a door stop, while allowing rotation of the door holder about the fixed structure.

6 Claims, 13 Drawing Sheets

(56) References Cited

FOREIGN PATENT DOCUMENTS

| | | | | |
|---|---|---|---|---|
| EP | 2295689 | A1 * | 3/2011 | ............. E05C 17/48 |
| FR | 2855203 | | 11/2004 | |
| FR | 3113918 | | 3/2022 | |
| GB | 342366 | | 2/1931 | |
| GB | 386036 | | 1/1933 | |
| GB | 2340537 | | 2/2000 | |
| JP | 2013060785 | | 4/2013 | |
| JP | 2018178585 | | 11/2018 | |

* cited by examiner

DOOR HOLDER

CROSS-REFERENCE TO RELATED APPLICATIONS

The present disclosure is related and claims priority to U.S. Provisional Pat. Appl. No. 63/358,056, filed on Jul. 1, 2022, the contents of which are hereby incorporated by reference in their entirety, for all purposes.

BACKGROUND

Field of Disclosure

Embodiments of the invention described herein are generally related to a door holder, also known as a door catch. More specifically, embodiments of the invention are designed to cooperate with a door stop device to keep a door in an open position. One or more of the embodiments may be added to preexisting door stops, while others incorporate an integral door stop.

Typically, doors installed in commercial and/or residential facilities include a door stop. The door stop prevents—or "stops"—the door from opening excessively so as to damage surrounding areas. For example, a door might open (i.e., "swing") beyond the point needed for ingress or egress and then collide with and damage a nearby wall. Consequently, a door stop is generally used to prevent a door from opening beyond what is needed and repeatedly causing damage.

There are many types of door stops. One type mounts on a door hinge and limits the rotation of the hinge. That, in turn, limits the swing of the door. Another type of door stop incorporates a wall mounted projection installed near the point of the maximum desired door swing. As the door is opened it will eventually contact the projection and cease to open farther.

Yet another type of door stop 100 is shown in FIG. 1. It is approximately spherical in shape and is mounted at the desired stop position on the floor over which the door swings. The door stop includes a flat vertical surface that is typically cushioned to, e.g., prevent damage to the door. This vertical surface contacts the door when the latter opens and limits the extent of the swing. Some embodiments of the invention are configured to work with this type of door stop 100.

SUMMARY

Embodiments of the invention include rotatable apparatus that engages a door stop and a movable door to hold the door in an open position. In one embodiment the dimensions of the rotatable apparatus are fixed.

In another embodiment the dimensions of the rotatable apparatus are adjustable so as to allow an improved fit between the door stop, the movable door, and the underlying floor.

In another embodiment the apparatus includes a flexible, spring-like structure to capture, hold, and release the movable door.

In yet another embodiment the apparatus uses magnetic force to capture, hold, and release the movable door.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Embodiments of the invention as disclosed herein provide apparatus for controlling the open and closed states of a door, particularly doors that use mechanical closers or other devices that force a door to close unless otherwise held open. These embodiments, when used with door stops, maintain a door in an open position. One advantage of these embodiments is that they allow the door to be released quickly from the held-open position so as to allow the door to close.

Figure 1:
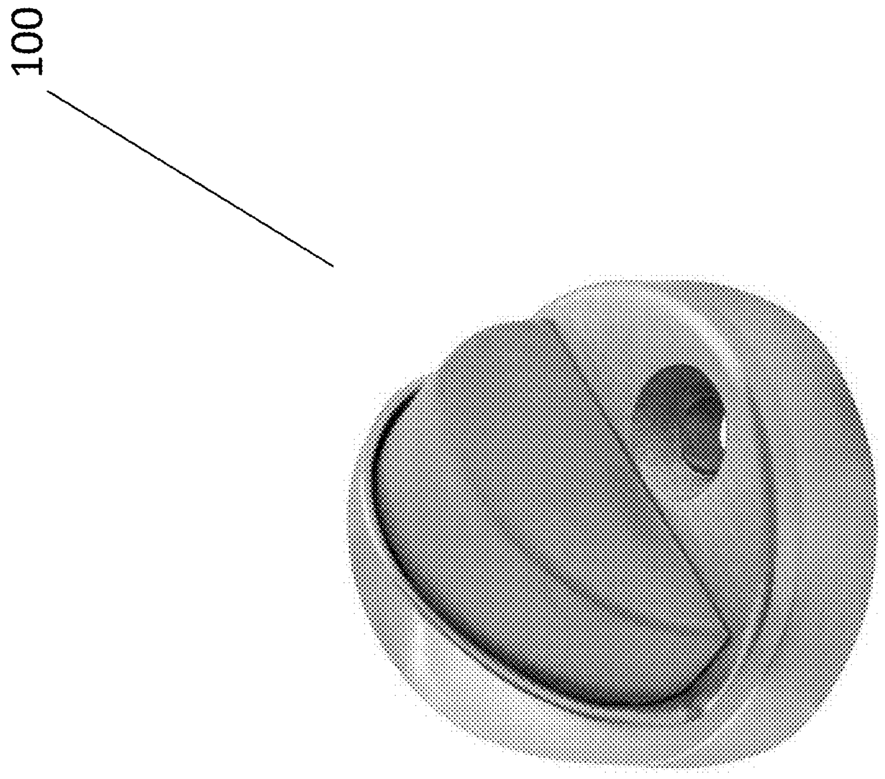
FIG. 1 illustrates typical floor-mounted door stop.
Figure 2A:
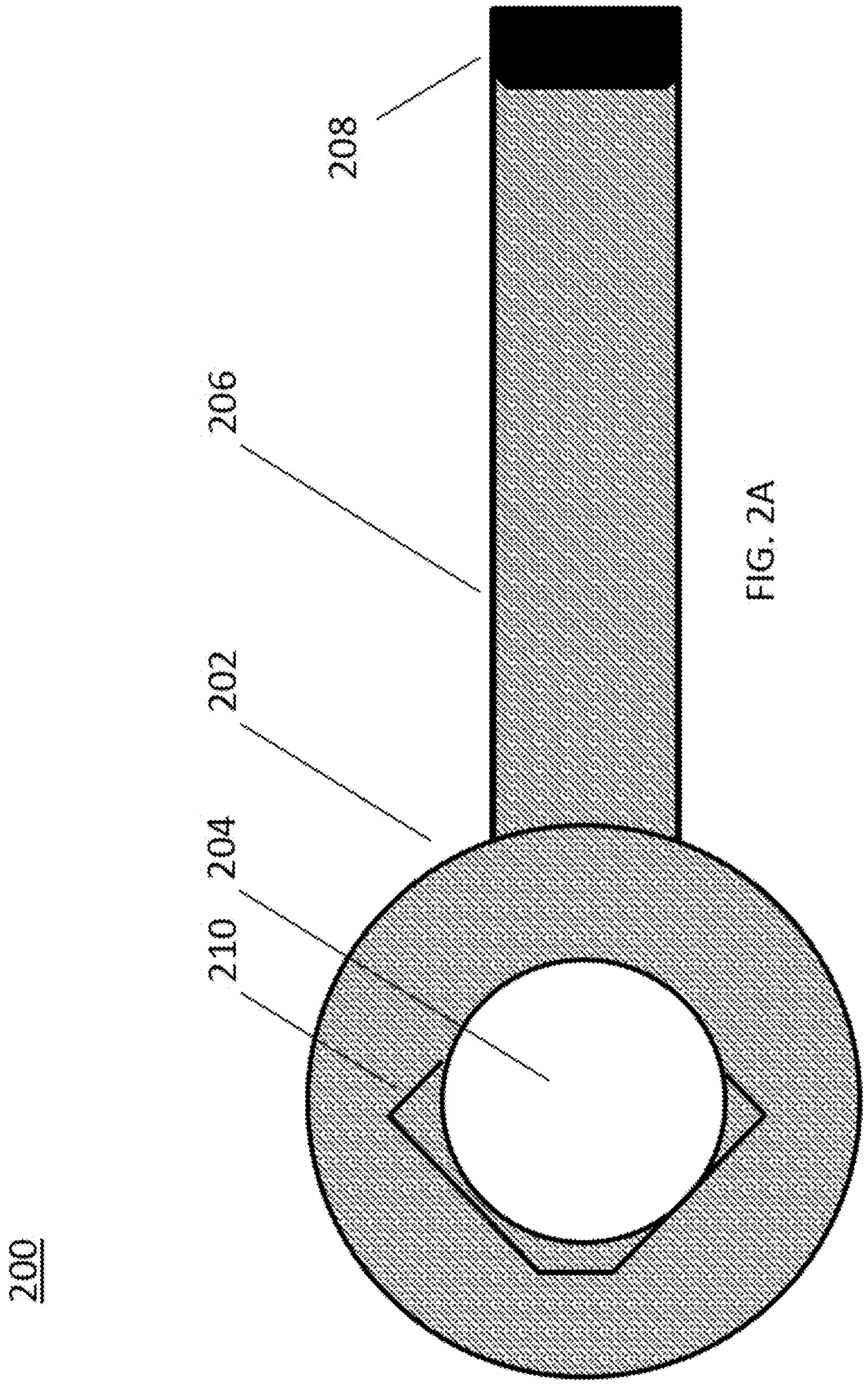
FIG. 2A illustrates a top view of a door holder, according to some embodiments.
Figure 2B:
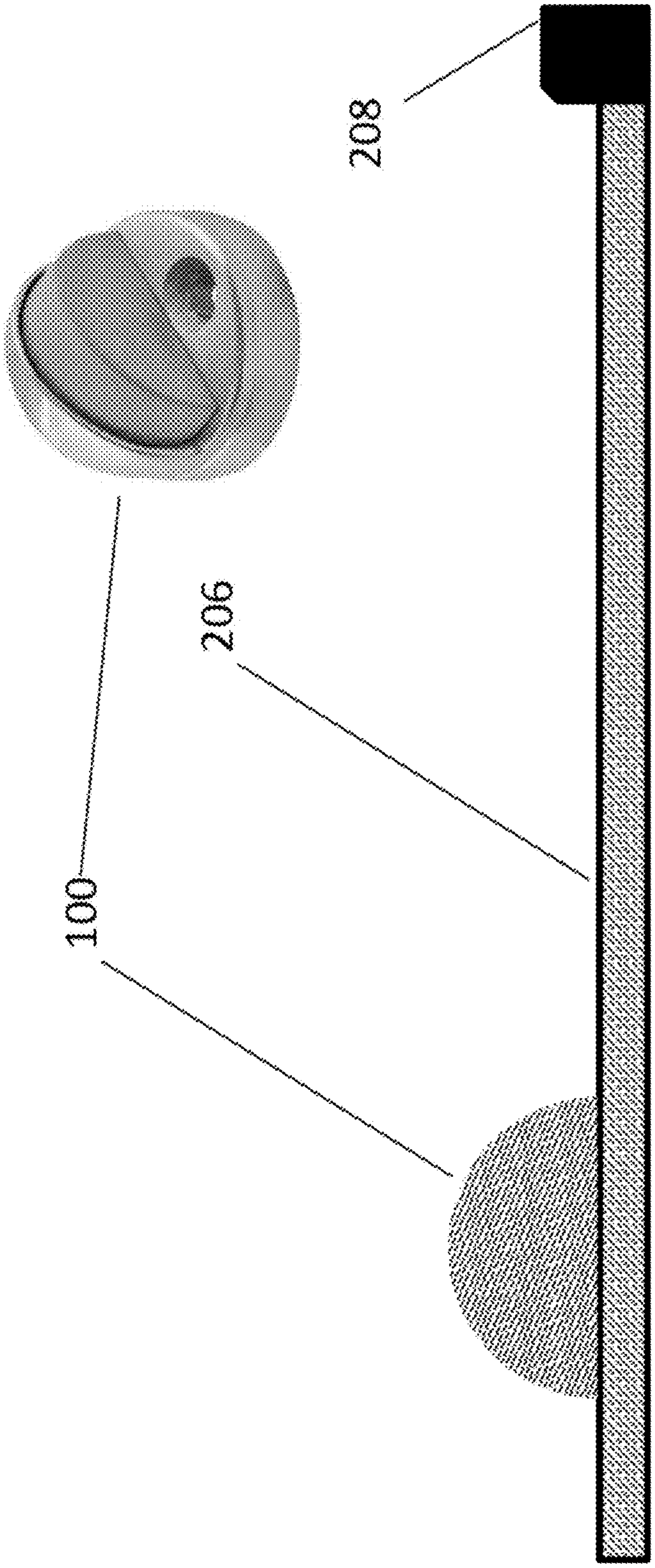
FIG. 2B illustrates a side view of the door holder of FIG. 2A, according to some embodiments.

Some embodiments of the door holder 200 may be generally depicted as shown in FIGS. 2A (top view) and 2B (side view). These embodiments include a ring 202 that defines a hole 204 that is sized to slip over a door stop 100 like that shown in FIG. 1 and allows the holder 200 to rotate freely about the stop 100. Attached to the ring 202 is a leg 206 of sufficient length to pass under an opened door. The leg 206 terminates at a distal end in a raised lip 208.

In some embodiments the door stop 100 is a separate structure. In such embodiments the door holder 200 cooperates with the door holder 100 to provide the desired operation. In other embodiments the door stop 100 is part of (e.g., integral to) the door holder 200.

Figure 3:
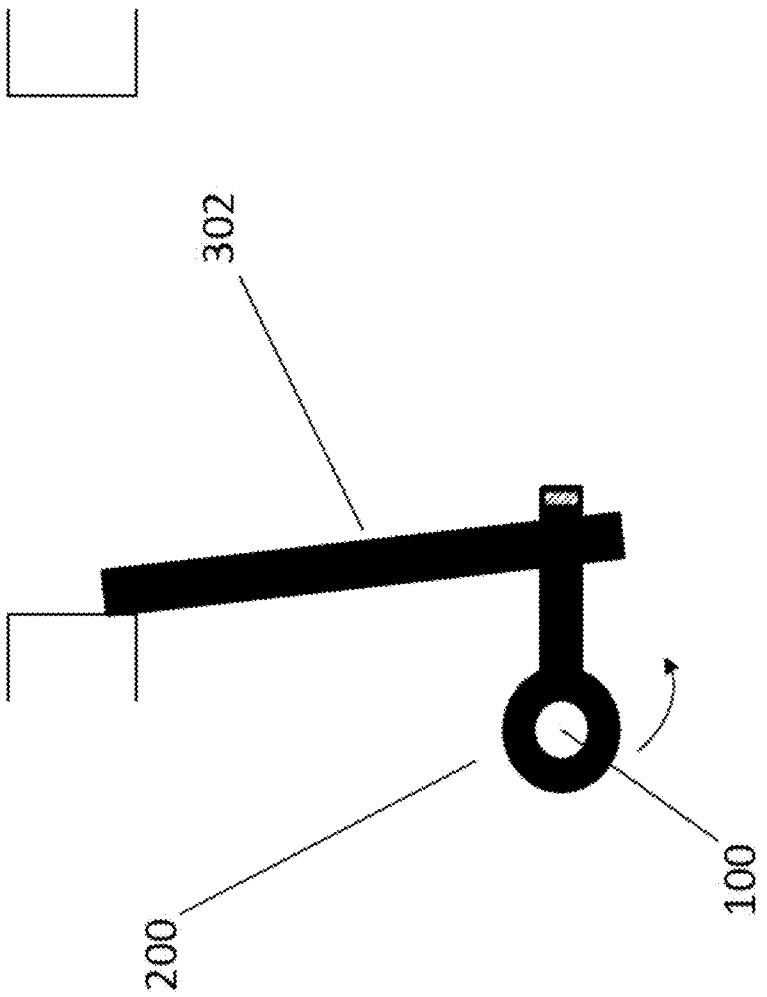
FIG. 3 illustrates a top view of a door holder holding a door open, according to some embodiments.
Figure 4:
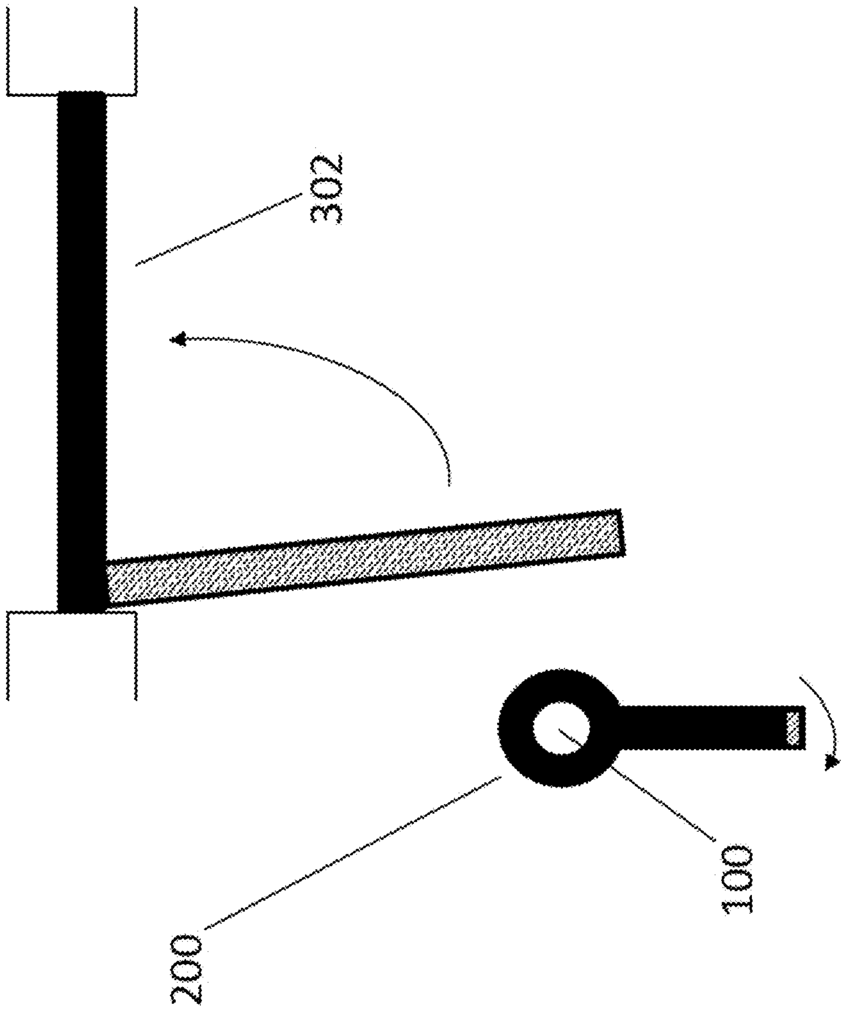
FIG. 4 illustrates a top view of a door holder releasing a door to allow the latter to close, according to some embodiments.

In some embodiments, and as generally shown in FIG. 3, the door holder 200 rotates around the door stop 100 into a first position that is approximately perpendicular to the surface of door 302. In this position it holds the door 302 open by catching the bottom edge of the door 302 on the raised lip 208 at the end of the leg 206. In some embodiments, and as generally shown in FIG. 4, the door holder 200 can be rotated approximately ninety degrees about the stop 100 to a second position approximately parallel to the surface of door 302. In this position it releases the door 302, allowing it to close.

In some embodiments, the door holder 200 includes a retaining means 210 to keep it from being inadvertently removed but still allows it to rotate freely. In one embodiment, the retaining means 210 is a clip located around the hole 204 that secures the holder 200 to the stop 100. In other embodiments, the retaining means 210 includes at least one washer and/or snap ring placed over the door stop 100 and door holder 200 ring 202 that prevents the holder 200 from lifting off of the stop 100. Some embodiments include set-screws or other fasteners as the retaining means 210 to secure the holder 200 to the stop 100 while still allowing the holder 200 to rotate freely about the stop 100.

Figure 5:
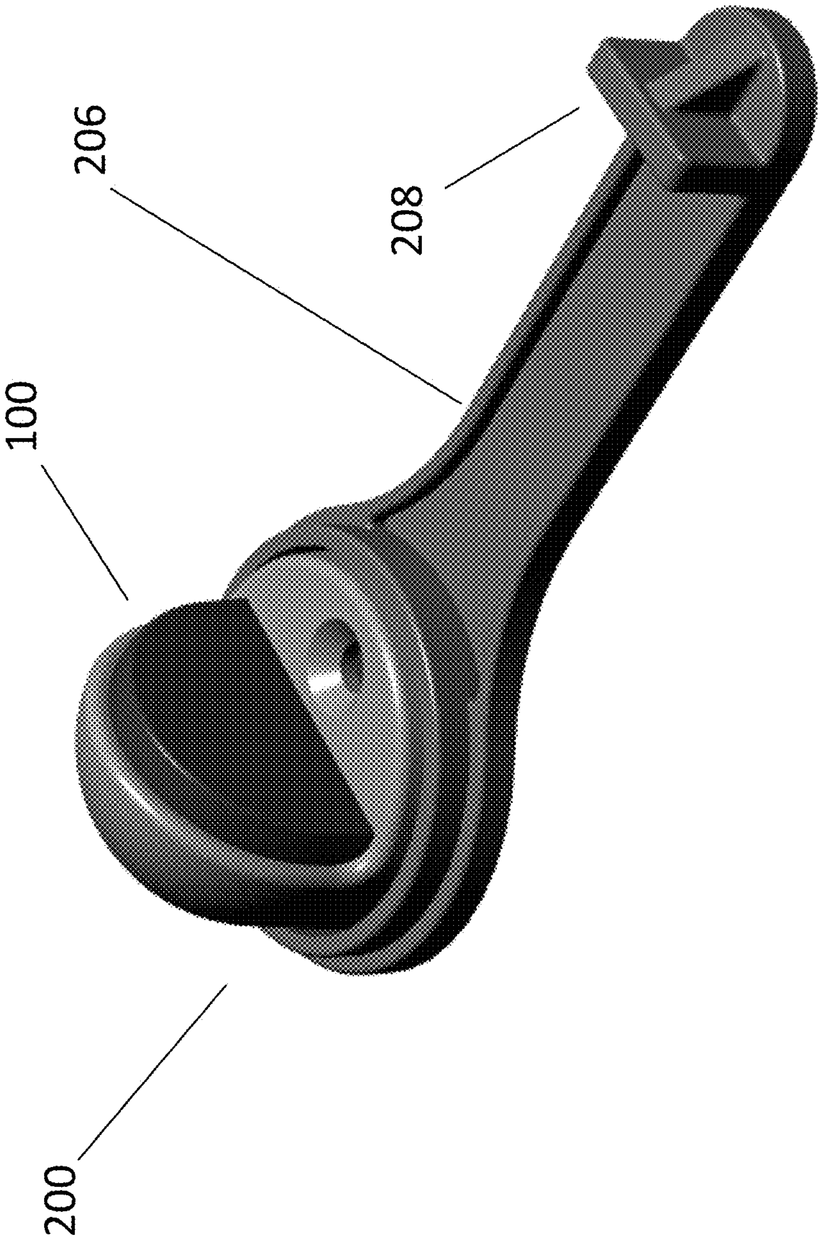
FIG. 5 illustrates an isometric view of a door holder, according to some embodiments.

In some embodiments, a portion of the door holder 200 is installed under the door stop 100. These embodiments typically and inherently prevent the holder 200 from lifting off of the stop 100. One such embodiment is generally shown in FIG. 5. The stepped configuration of the ring 202 allows an inner portion of the ring 202 to remain under the stop 100. At the same time an outer portion of the ring 202 rotates freely relative to an inner portion of the ring 202.

If the door stop 100 is already installed, some embodiments require that the stop 100 be partially or fully removed and reinstalled with the holder 200 first placed underneath the stop 100.

Figure 6:
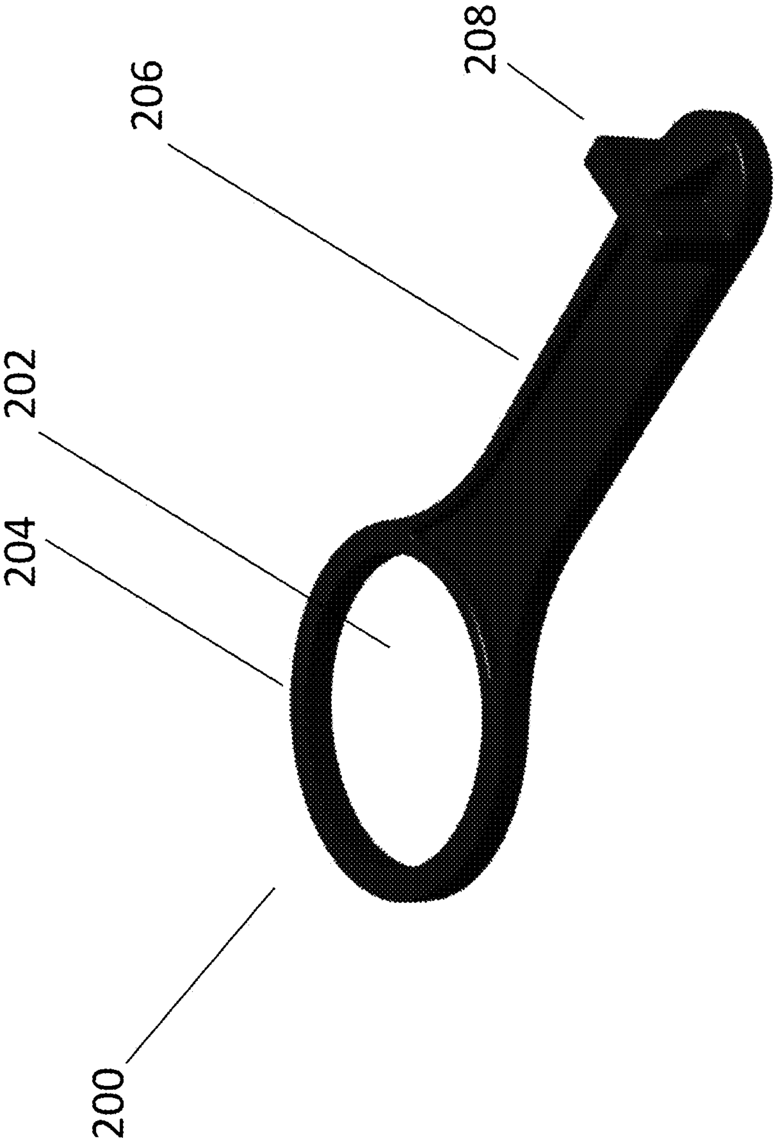
FIG. 6 illustrates an isometric view of an alternative door holder, according to some embodiments.
Figure 7:
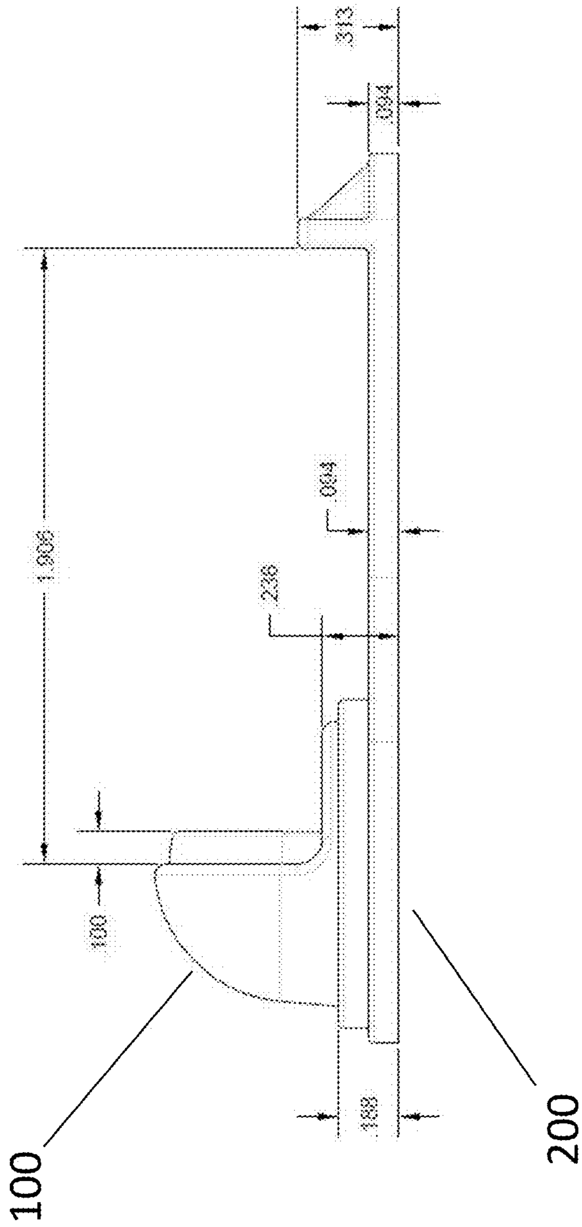
FIG. 7 illustrates a side view of a door holder with exemplary dimensions, according to some embodiments.
Figure 8:
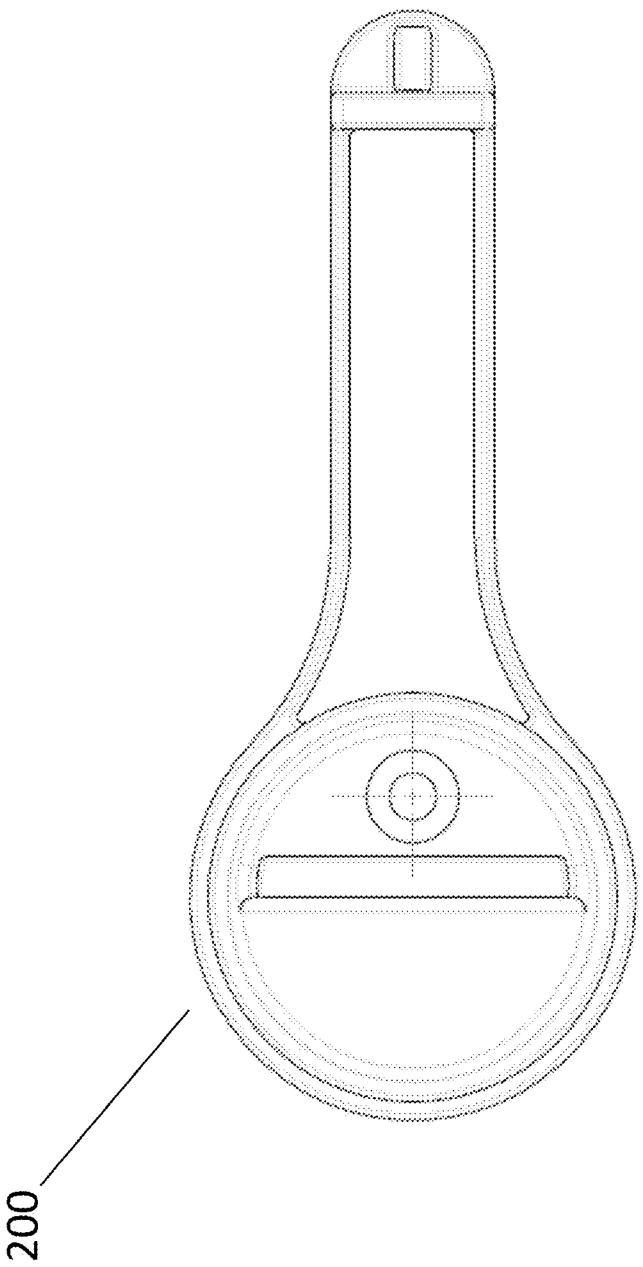
FIG. 8 illustrates a top view of the door holder of FIG. 7, according to some embodiments.
Figure 9:
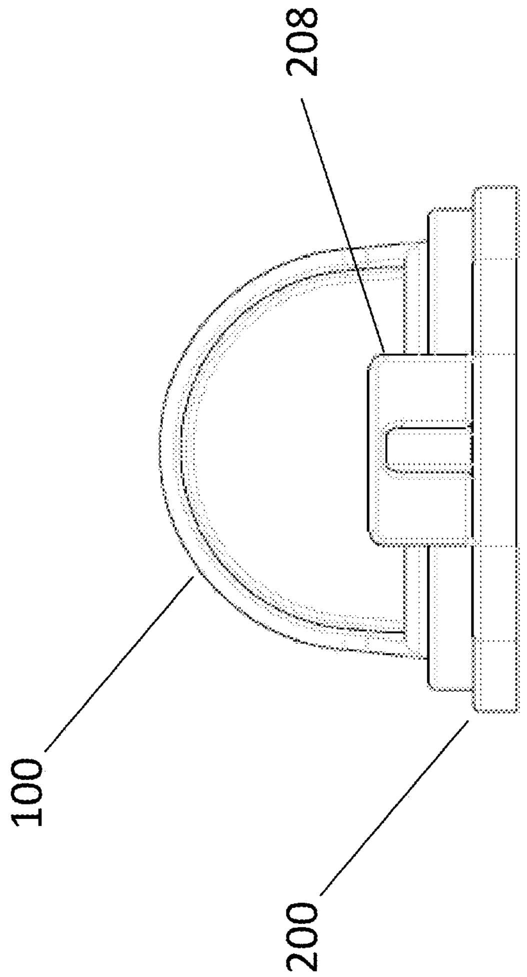
FIG. 9 illustrates a distal end view of the door holder of FIG. 7, according to some embodiments.
Figure 10:
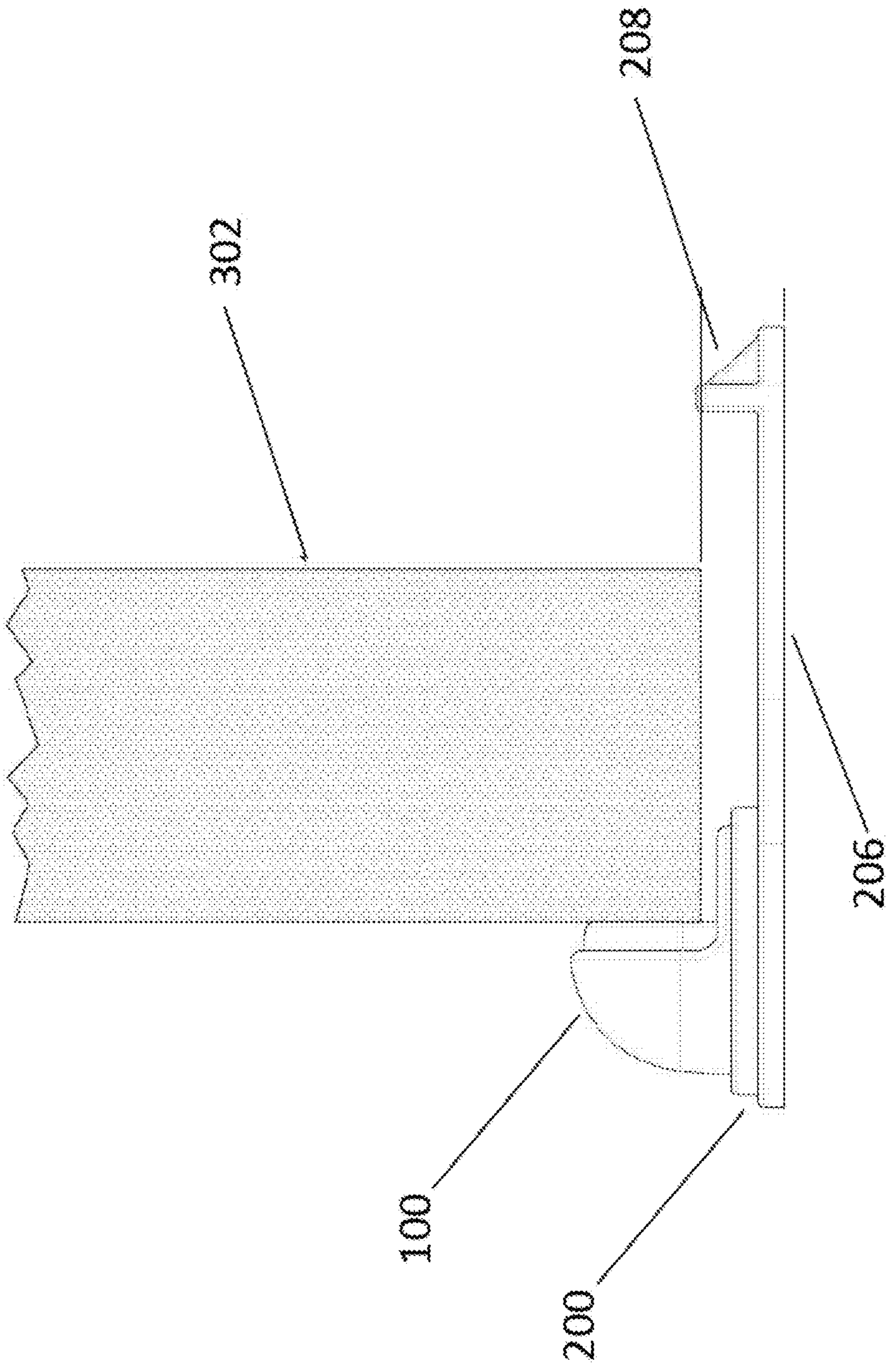
FIG. 10 illustrates a side view of the door holder of FIG. 7, according to some embodiments.

In some embodiments, and as generally shown in FIG. 6, the leg 206 and lip 208 of the door holder 200 are fixed in position and size. For example, FIG. 7 shows exemplary dimensions (in inches) of an embodiment, where the leg 206 and lip 208 of the door holder 200 are fixed in position and size, and where a portion of the door holder is installed under the door stop 100. FIG. 8 is a top view, FIG. 9 is a distal end view, and FIG. 10 is a side view, of the embodiment depicted in FIG. 7.

Figure 11:
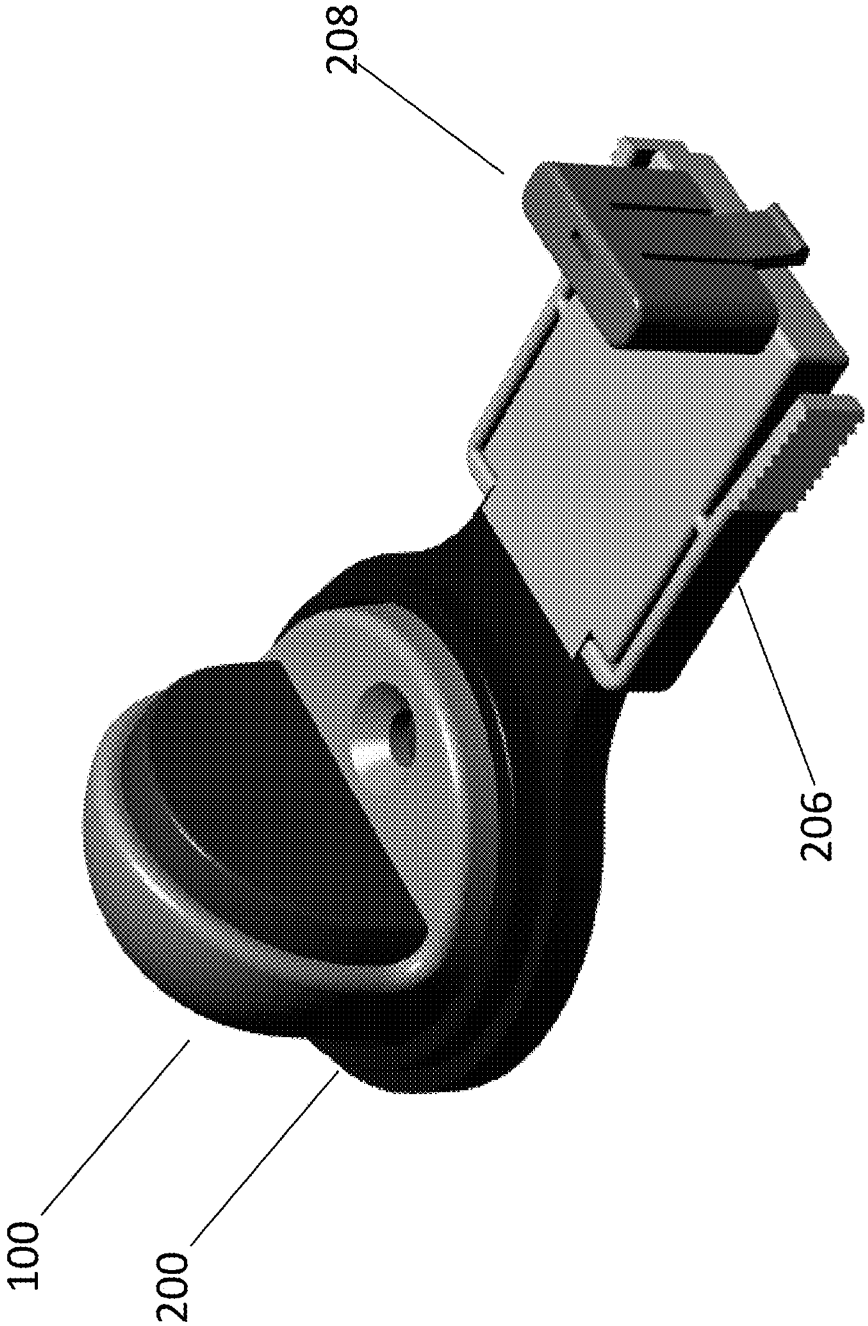
FIG. 11 illustrates an isometric view of a door holder with adjustable features, according to some embodiments.

In some embodiments, and as generally shown in FIG. 11, the leg 206 and/or lip 208 are adjustable. For example, in some installations the door stop 100 might be located at a point where an adjustment of the length of the leg 206 is needed to pivot the holder 200 around the edge of the door 302 without obstruction. An adjustable length leg 206 allows changing the size of the opening that the held open door provides, as well. In other embodiments, the leg 206 rotates, e.g., from flat (e.g., parallel to floor) to upright (e.g., perpendicular to floor) orientations. In still other embodiments, the length and/or orientation of the leg 206 changes as the holder 200 rotates about the stop 100 by means of, e.g., a linkage.

Embodiments where the lip 208 is adjustable include those where the height of the lip 208 may be increased and/or decreased to, e.g., accommodate different floor-to-door-bottom clearances. In other embodiments, the lip 208 rotates, e.g., from upright (e.g., perpendicular to floor) to flat (e.g., parallel to floor) orientations. In still other embodiments, the height and/or orientation of the lip 208 changes as the holder 200 rotates about the stop 100 by means of, e.g., a linkage.

Embodiments in which the leg 206 and/or lip 208 are adjustable optionally include a locking feature that retains the leg 206 and/or lip 208 in the newly-adjusted position(s). In some embodiments, the locking feature includes a quick-release element that a user may activate by, for example, tapping the holder 200 with his foot.

Figure 12:
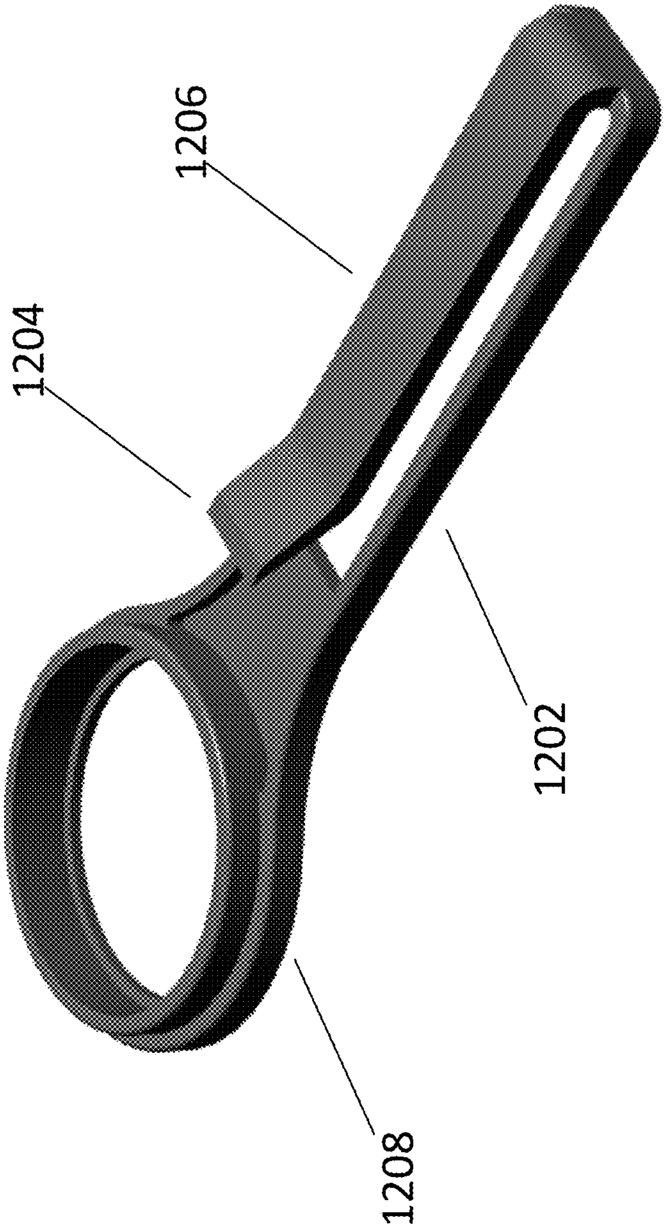
FIG. 12 illustrates an isometric view of a door holder with spring features, according to some embodiments.

In some embodiments, and as generally shown in FIG. 12, the leg 1202 and lip 1204 form a flexible, spring-like structure where the lip 1202 is located near the ring 1208 on a flexible return element 1206. In operation, these embodiments typically catch and hold the door approximately between the ring 1208 and the lip 1204. A user releases the door 302 by stepping on the flexible return element 1206 to lower the lip 1204 such that it passes under the door 302. The lip 1204, in some embodiments, has a chisel-like point. In other embodiments, the lip 1204 has a blunt point. In still other embodiments, the lip 1204 has a rubber or rubber-like surface that contacts the door 302.

In some embodiments, the door holder 200 uses magnetism to catch and hold the door 302 instead of, or in addition to, the lip 208. In some embodiments, the leg 206 and/or lip 208 of the holder 200 is magnetically attracted to the door 302. In other embodiments, a magnet or magnetically-attractive surface on the bottom edge of the door 302 attracts and holds the leg 206 and/or lip 208 when they are near each other. This attraction holds the door 302 open. To release the door 302, some embodiments include a structure that a user may actuate (e.g., step on) to force a separation between the magnetically-attracted objects and overcome the magnetic force.

In some embodiments, one or more springs may assist with the rotation of the door holder 200 about the door stop 100. Some such embodiments compress one or more springs when the holder 200 is moved into the open position (see FIG. 4) and include a lock to keep the holder 200 in that position. When released, e.g., by a foot tap, the springs propel the holder 200 into the hold position (see FIG. 3). Still other embodiments work in the reverse fashion, i.e., locking the holder 200 in the hold position and, on release, propelling the holder 200 into the open position.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f), unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A door holder, comprising:

a ring defining a hole;

a leg having one end proximate to the ring and a second distal end, the leg having at least one adjustable parameter;

a lip located near the distal end of the leg; and a retaining means located near the ring to fasten the door holder through the hole to a fixed structure while allowing rotation of at least part of the door holder about the fixed structure;

wherein the door holder engages a door having an upper edge proximate to a ceiling and a lower edge proximate to a floor and the rotation of the at least part of the door holder occurs beneath the lower edge of the door.

2. The door holder of claim 1, wherein the at least one adjustable parameter of the leg is the length of the leg.

3. The door holder of claim 1, wherein the lip has at least one adjustable parameter.

4. The door holder of claim 3, wherein the at least one adjustable parameter of the lip is the height of the lip.

5. The door holder of claim 1, wherein the retaining means comprises a snap ring.

6. The door holder of claim 1, wherein the fixed structure comprises a door stop.

* * * * *